United States Patent
Liang et al.

(10) Patent No.: US 11,809,748 B2
(45) Date of Patent: Nov. 7, 2023

(54) CONTROL METHOD OF FLASH MEMORY CONTROLLER AND ASSOCIATED FLASH MEMORY CONTROLLER AND ELECTRONIC DEVICE

(71) Applicant: Silicon Motion, Inc., Hsinchu County (TW)

(72) Inventors: Chia-Chi Liang, Hsinchu County (TW); Tsu-Han Lu, Hsinchu (TW); Hsiao-Chang Yen, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 0 days.

(21) Appl. No.: 17/692,121

(22) Filed: Mar. 10, 2022

(65) Prior Publication Data
US 2023/0289098 A1    Sep. 14, 2023

(51) Int. Cl.
*G06F 3/06*        (2006.01)

(52) U.S. Cl.
CPC ............ *G06F 3/0659* (2013.01); *G06F 3/064* (2013.01); *G06F 3/0611* (2013.01); *G06F 3/0679* (2013.01)

(58) Field of Classification Search
CPC ...... G06F 3/0659; G06F 3/0611; G06F 3/064; G06F 3/0679
See application file for complete search history.

(56) References Cited

U.S. PATENT DOCUMENTS

| 2016/0283138 | A1  | 9/2016  | Lehman |
| 2020/0226026 | A1* | 7/2020  | Wu ................... G06F 11/362 |
| 2021/0334000 | A1  | 10/2021 | Ji |

FOREIGN PATENT DOCUMENTS

| TW | 200928719   | 7/2009 |
| TW | 201926350 A | 7/2019 |
| TW | 202115732 A | 4/2021 |

* cited by examiner

*Primary Examiner* — Kalpit Parikh
(74) *Attorney, Agent, or Firm* — Winston Hsu

(57) ABSTRACT

The present invention provides a control method of a flash memory controller, wherein the flash memory controller is configured to access a flash memory module, the flash memory module includes a plurality of planes, and each plane includes a plurality of blocks; and the control method includes the steps of: after the flash memory controller is powered on, reading a first code bank from a specific block of the plurality of blocks; storing the first code bank into a buffer memory; executing the first code bank to manage the flash memory module; when the flash memory controller starts a code bank swapping operation, trying to read a second code bank from a super block; if the second code bank is read successfully, storing the second code bank into the buffer memory to replace the first code bank; and executing the second code bank to manage the flash memory module.

15 Claims, 7 Drawing Sheets

CONTROL METHOD OF FLASH MEMORY CONTROLLER AND ASSOCIATED FLASH MEMORY CONTROLLER AND ELECTRONIC DEVICE

BACKGROUND OF THE INVENTION

1. Field of the Invention

The present invention relates to a flash memory controller.

2. Description of the Prior Art

In a conventional flash memory system, a code bank comprising an in-system programming (ISP) code is generally stored in a specific block of a flash memory module. When a flash memory controller is powered on, the flash memory controller will read the ISP code from the specific block and store the ISP code into a buffer within the flash memory controller, for subsequent use. However, the buffer capacity is limited, and a size of the ISP code will become larger as firmware of the flash memory controller is updated, so the ISP code may be divided into several code banks, and the buffer within the flash memory controller stores only one code bank. When the ISP code is divided into several code banks, each code bank will only comprise part of functions, and the flash memory controller may need to load the required code bank from the flash memory module to replace the current code bank stored in the buffer. Therefore, because the flash memory controller swaps the code banks based on the required functions to be used, the specific block storing the code banks will be read many times, causing read disturbance and affecting data quality.

SUMMARY OF THE INVENTION

It is therefore an objective of the present invention to provide a method for managing code banks, which can increase the robustness of the code banks and increase the speed of swapping code banks, to solve the above-mentioned problems.

According to one embodiment of the present invention, a control method of a flash memory controller is disclosed, wherein the flash memory controller is configured to access a flash memory module, the flash memory module comprises a plurality of planes, each plane comprises a plurality of blocks, and each block comprises a plurality of pages; and the control method comprises the steps of: after the flash memory controller is powered on, reading a first code bank from a specific block of the plurality of blocks; storing the first code bank into a buffer memory; executing the first code bank to manage the flash memory module; when the flash memory controller starts a code bank swapping operation, trying to read a second code bank from a super block, wherein the super block comprises a plurality of blocks respectively located in at least two planes; if the second code bank is read successfully, storing the second code bank into the buffer memory to replace the first code bank; and executing the second code bank to manage the flash memory module.

According to another one embodiment of the present invention, a flash memory controller is disclosed, wherein the flash memory controller is configured to access a flash memory module, the flash memory module comprises a plurality of planes, each plane comprises a plurality of blocks, and each block comprises a plurality of pages. The flash memory controller comprises a read only memory and a microprocessor, wherein the read only memory stores a program code, and the microprocessor is configured to execute the program code to control the access of the flash memory module. The microprocessor is configured to perform the steps of: after the flash memory controller is powered on, reading a first code bank from a specific block of the plurality of blocks; storing the first code bank into a buffer memory; executing the first code bank to manage the flash memory module; when the flash memory controller starts a code bank swapping operation, trying to read a second code bank from a super block, wherein the super block comprises a plurality of blocks respectively located in at least two planes; if the second code bank is read successfully, storing the second code bank into the buffer memory to replace the first code bank; and executing the second code bank to manage the flash memory module.

According to another one embodiment of the present invention, an electronic device comprising a flash memory module and a flash memory controller is disclosed. The flash memory module comprises a plurality of planes, each plane comprises a plurality of blocks, and each block comprises a plurality of pages. The flash memory controller is configured to perform the steps of: after the flash memory controller is powered on, reading a first code bank from a specific block of the plurality of blocks; storing the first code bank into a buffer memory; executing the first code bank to manage the flash memory module; when the flash memory controller starts a code bank swapping operation, trying to read a second code bank from a super block, wherein the super block comprises a plurality of blocks respectively located in at least two planes; if the second code bank is read successfully, storing the second code bank into the buffer memory to replace the first code bank; and executing the second code bank to manage the flash memory module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
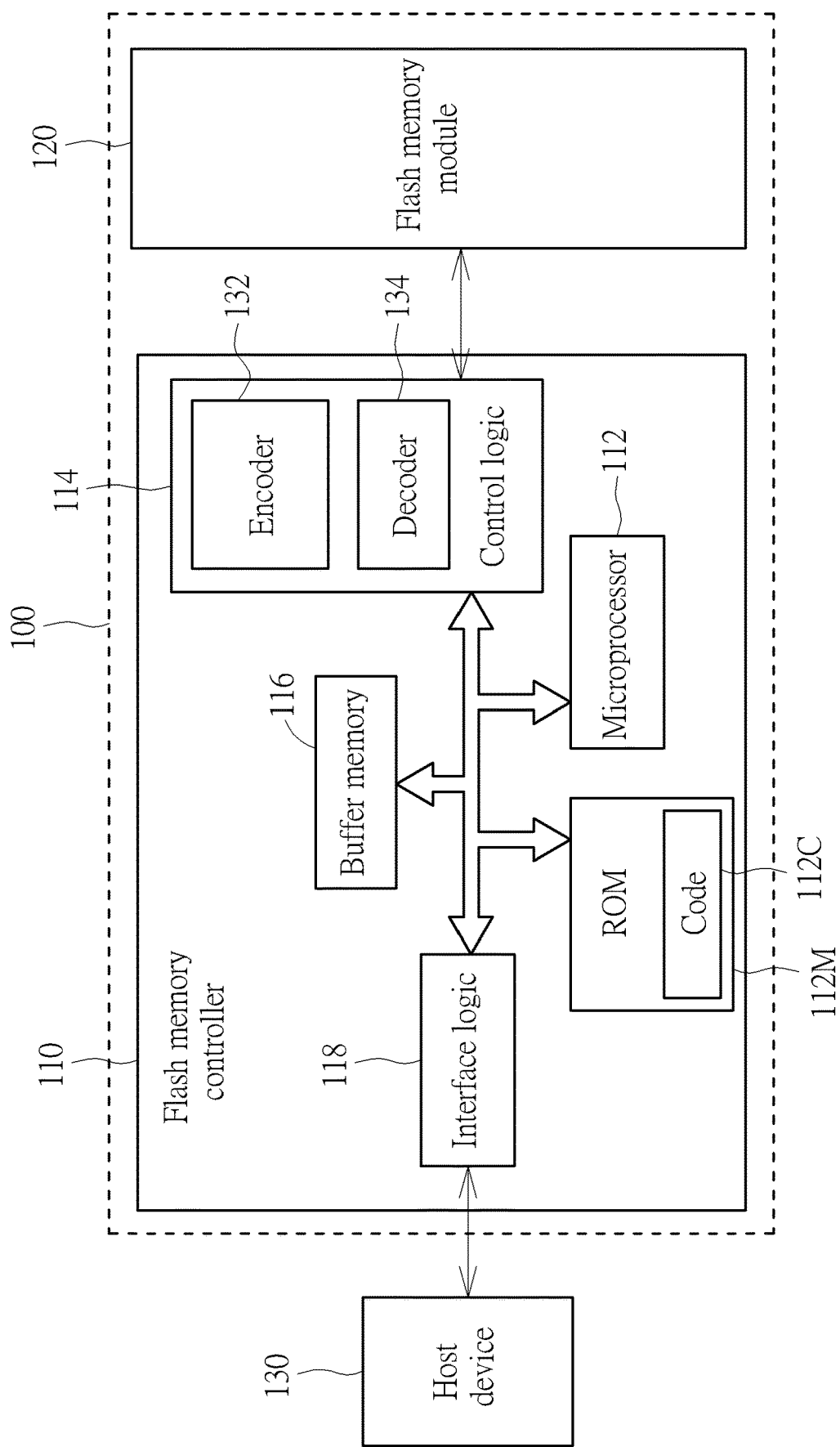
FIG. 1 is a diagram illustrating an electronic device according to an embodiment of the present invention.

FIG. 1 is a diagram illustrating an electronic device 100 according to an embodiment of the present invention. The electronic device 100 includes a flash memory module 120 and a flash memory controller 110. The flash memory controller 110 is configured to access the flash memory module 120. According to the present embodiment, the flash memory controller 110 includes a microprocessor 112, a read only memory (ROM) 112M, a control logic 114, a buffer memory 116 and an interface logic 118. The read only memory 112M is configured to store a code 112C, and the microprocessor 112 is configured to execute the code 112C to control access of the flash memory module 120. The control logic 114 includes an encoder 132 and a decoder 134, wherein the encoder 132 is configured to encode data which is written in the flash memory module 120 to generate a corresponding check code (also known as an error correction code (ECC)), and the decoder 134 is configured to decode data read from the flash memory module 120.

In a general situation, the flash memory module 120 includes a plurality of flash memory chips, and each flash memory chip includes a plurality of blocks. The flash memory controller 110 performs a block-based erase operation upon the flash memory module 120. In addition, a block can record a specific number of pages, wherein the flash memory controller 110 performs a page-based write operation upon the flash memory module 120. In the present embodiment, the flash memory module 120 is a 3D NAND-type flash memory module, but it's not a limitation of the present invention.

Specifically, through the microprocessor 112 executing the code 112C, the flash memory controller 110 may use its own internal components to perform many control operations. For example, the flash memory controller 110 uses the control logic 114 to control access of the flash memory module 120 (especially access of at least one block or at least one page), uses the buffer memory 116 to perform a required buffering operation, and uses the interface logic 118 to communicate with a host device 130. The buffer memory 116 is implemented by a random access memory (RAM). For example, the buffer memory 116 may be a static RAM (SRAM), but the present invention is not limited thereto.

In one embodiment, the electronic device 100 may be a portable memory device such as a memory card which conforms to one of the SD/MMC, CF, MS and XD specifications, and the host device 130 is another electronic device able to be connected to the electronic device 100, such as a cellphone, a laptop, a desktop computer, etc. In another embodiment, the electronic device 100 may be a solid state drive (SSD) or an embedded memory device which conforms to the universal flash storage (UFS) specification or embedded Multi Media Card (EMMC) specification, and can be arranged in a cellphone, a laptop or a desktop computer. At this time, the host device 130 can be a processor of the cellphone, a processor of the laptop or a processor of the desktop computer.

Figure 2:
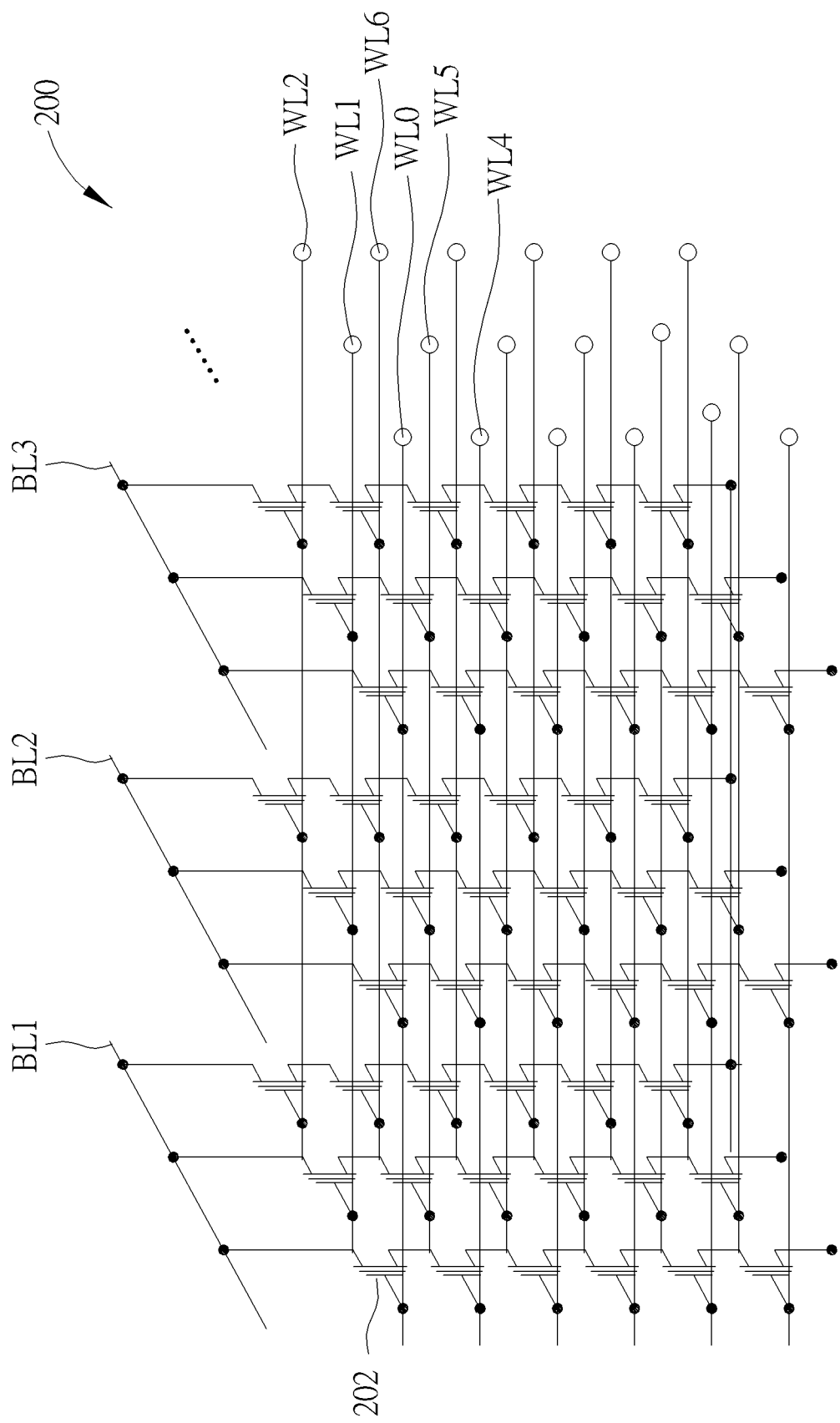
FIG. 2 is a diagram illustrating a block of the flash memory module according to an embodiment of the present invention.

FIG. 2 is a diagram illustrating a block 200 of the flash memory module 120 according to an embodiment of the present invention, wherein the flash memory module 120 is a 3D NAND-type flash memory module. As shown in FIG. 2, the block 200 includes a plurality of memory cells, such as floating gate transistors 202 shown in FIG. 2 or other charge trapping components. A 3D NAND-type flash memory structure is formed through a plurality of bit lines (only BL1-BL3 are shown in FIG. 2) and a plurality of word lines (e.g., WL0-WL2, WL4-WL6 and following word lines shown in FIG. 2). Taking a top plane in FIG. 2 as an example, all floating gate transistors on the word line WL0 form at least one page, all floating gate transistors on the word line WL1 format least another one page, and so on. In addition, the definition between the word line WL0 and the page (logic page) may vary depending on a writing method of the flash memory. In detail, when data are stored using a single-level cell (SLC) means, all floating gate transistors on the word line WL0 correspond to only one logic page; when data are stored using a multi-level cell (MLC) means, all floating gate transistors on the word line WL0 correspond to two logic pages; when data are stored using a TLC means, all floating gate transistors on the word line WL0 correspond to three logic pages; and when data are stored using a QLC means, all floating gate transistors on the word line WL0 correspond to four logic pages. The 3D NAND-type flash memory structure and the relationship between word lines and pages are obvious to those skilled in the art. For simplification, no further illustration is provided.

In addition, the flash memory module 120 stores an ISP code, and the ISP code serves as a firmware code for the flash memory controller 110 to load and execute. Specifically, when the electronic device 100 is powered on, the microprocessor 112 within the flash memory controller 110 will read the code 112C within the ROM 112M to initialize the electronic device 100 and perform some basic operations. After the code 112C is executed, the flash memory controller 110 reads part of the ISP code from a specific block within the flash memory module 120, then the flash memory controller 110 executes the ISP code to control and manage the flash memory module 120. As described in the prior art, the ISP code may be divided into several code banks, and flash memory controller 110 loads only part of the code banks due to the limited size of the buffer memory 116 (for example, the buffer memory 116 is 128 KB, two 64 KB code banks or four 32 KB code banks can be stored in the buffer memory 116), so the flash memory controller needs to swap the code bank based on the required functions to be used, thereby the specific block storing the code banks will be read frequently, causing read disturbance and affecting data quality. To solve this problem, the embodiment provides an arrangement of the code banks and a method of loading the code banks, to increase the robustness of the code banks and increase the speed of swapping code banks.

Figure 3:
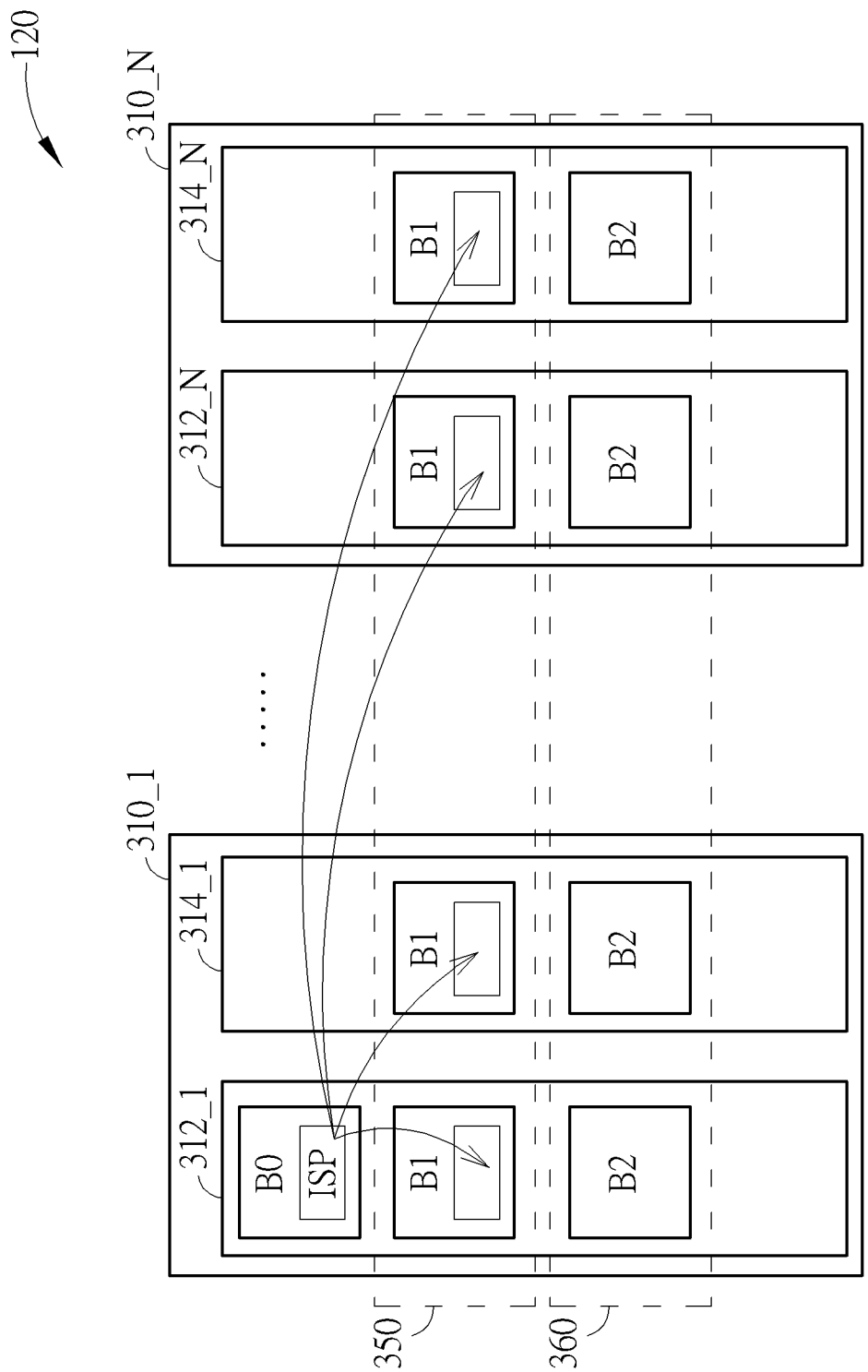
FIG. 3 shows the code banks stored in the flash memory module according to one embodiment of the present invention.

Specifically, FIG. 3 shows the code banks stored in the flash memory module 120 according to one embodiment of the present invention. As shown in FIG. 3, the flash memory controller 120 comprises a plurality of flash memory chips 310_1-310_N, and each of the flash memory chips 310_1-310_N may be divided into several planes such as two planes or four planes. In this embodiment, each flash memory chip has two planes, that is, the flash memory chips 310_1 has two planes 312_1 and 314_1, and the flash memory chips 310_N has two planes 312_N and 314_N. In addition, each plane has many blocks, and the block B0 of the plane 312_1 serves as the specific block to store the ISP code (code banks), and the flash memory controller 110 configures part of the other blocks belonging to different planes in the flash memory module 120 into a super block to facilitate the management of data access. Specifically, the block B0 of the plane 312_1 serving as the specific block does not belong to any super block, that is the flash memory controller 110 reads the block B0 by using one-plane-read operations. The flash memory controller 110 configures blocks B1 of all planes 312_1, 314_1, . . . , 312_N and 314_N as a super block 350, and configures blocks B2 of all planes 312_1, 314_1, . . . , 312_N and 314_N as a super block 360, and so on. The super block 350/360 comprises many physical blocks, and the flash memory controller 110 treats the super block 350/360 as a normal block when accessing the super block 350/360. For example, the super block 350/360 itself is an erasing unit, that is, although many blocks B1/B2 of the super block 350/360 can be erased separately, the flash memory controller 110 must erase all the blocks B1/B2 together. In addition, the super block is a logical block set by the flash memory controller 110 to facilitate management of the storage space, and is not a physical block. In addition, the flash memory controller 110 can read the super block 350/360 by using multi-plane-read operations.

In one embodiment, the super block 350/360 supports the garbage collection mechanism, that is the flash memory controller 110 can determine if performing the garbage collection operation upon the super block 350/360 according to some information such as data quality of the super block 350/360 or a read count of the super block 350/360; however, the block B0 does not support the garbage collection mechanism, that is the flash memory controller 110 does not add the block B0 into a garbage collection queue. In one embodiment, the super block 350/360 has redundant array of independent disks (RAID) mechanism, that is if the flash memory controller 110 fails to read one block of super block 350, the flash memory controller 110 can read the other blocks of super block 350 to recover data of the one block; however, because the block B0 does not belong to any super block, the flash memory controller 110 cannot use the RAID mechanism to recover the data of the block B0 if the block B0 cannot be read.

In addition, one or more super blocks may be used to store the management information such as logical address to physical address mapping tables, physical address to logical address mapping tables and other tables, and the super block configured to store these tables is named as a meta block. In the following description, the super block 350 serves as the meta block. In this embodiment, the flash memory controller 110 can copy the ISP code in the block B0 to the super block 350, that is the flash memory controller 110 can use the single-plane-read operation to read the ISP code from the block B0, and the flash memory controller 110 can also use the multi-plane-read operation to read the ISP code from the super block 350.

Figure 4:
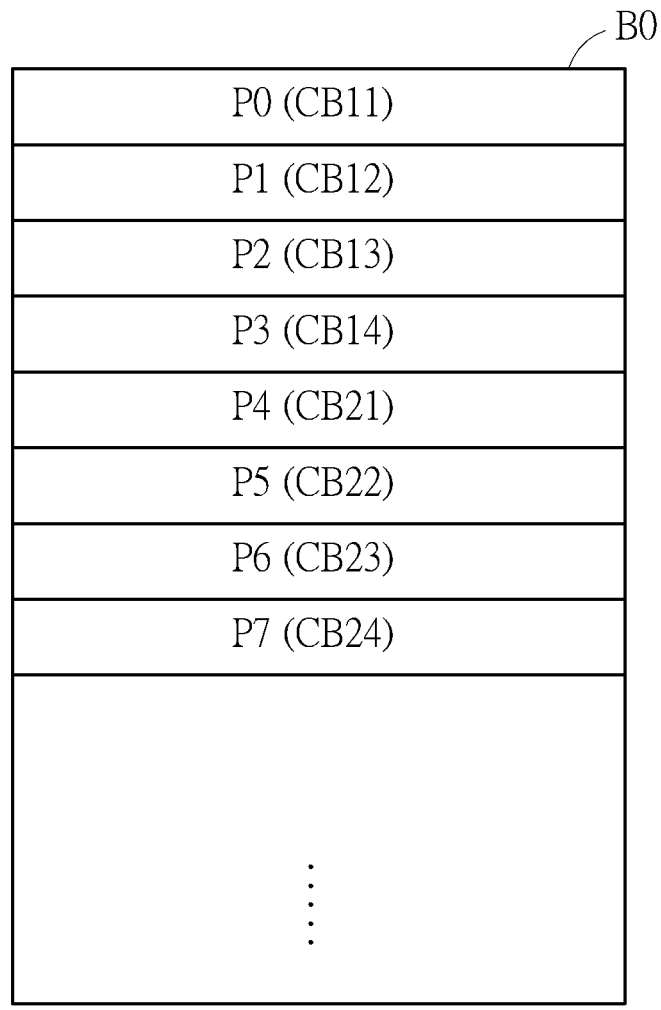
FIG. 4 shows the ISP code stored in the specific block according to one embodiment of the present invention.
Figure 5:
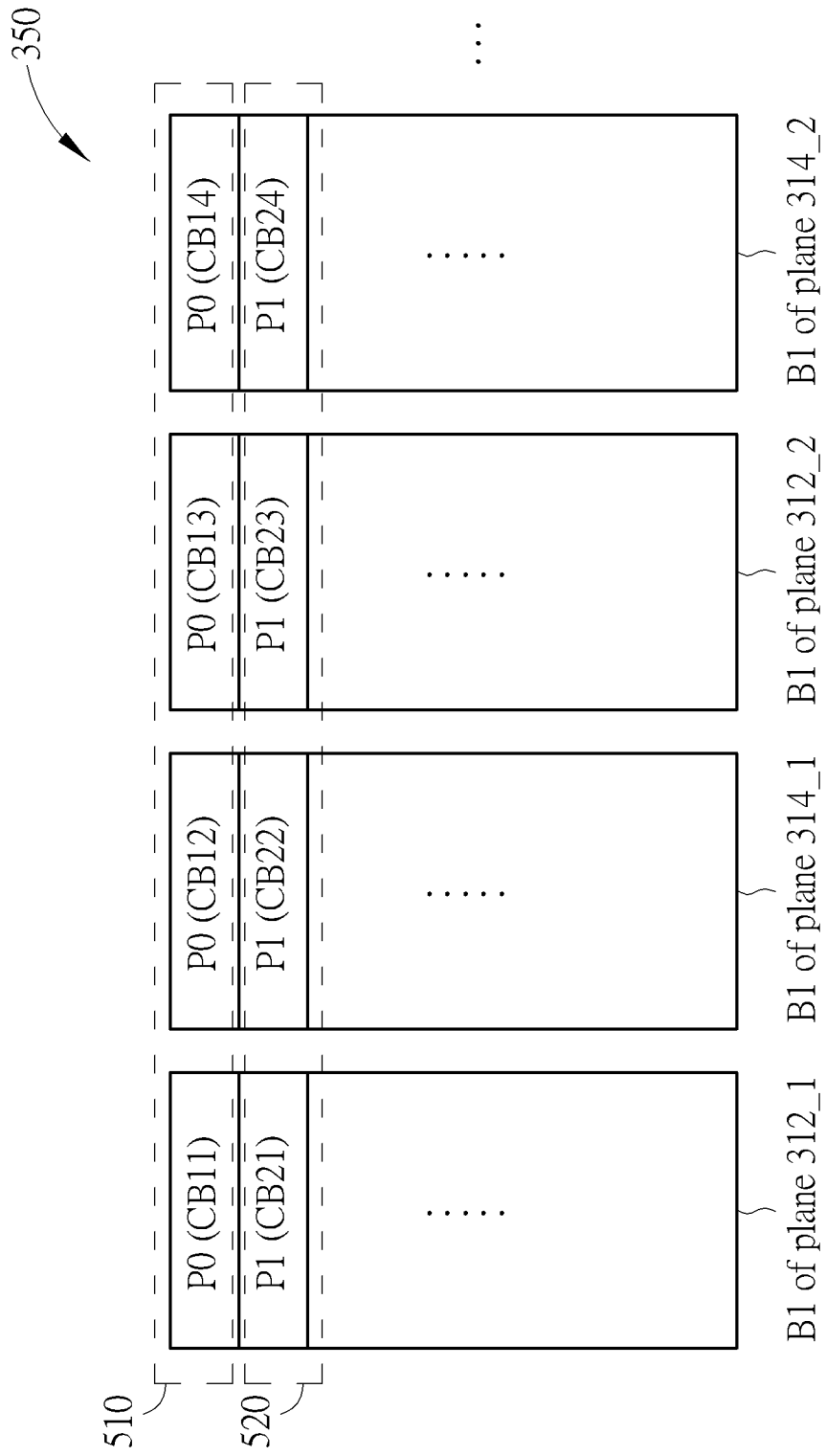
FIG. 5 shows the ISP code copied from the specific block to the super block according to one embodiment of the present invention.

FIG. 4 shows the ISP code stored in the block B0 according to one embodiment of the present invention. As shown in FIG. 4, it is assumed that the ISP code is divided into two code banks, a first code bank is stored in pages P0-P3 (i.e., CB11-CB14), and a second code bank is stored in pages P4-P7 (i.e., CB21-CB24). FIG. 5 shows the ISP code copied from the block B0 to the super block 350 according to one embodiment of the present invention. As shown in FIG. 5, CB11-CB14 are written into pages P0 of the blocks B1 of the planes 312_1, 314_1, 312_2 and 314_2, respectively, wherein the pages P0 of the planes form a super page 510; and CB21-CB24 are written into pages P1 of the blocks B1 of the planes 312_1, 314_1, 312_2 and 314_2, respectively, wherein the pages P1 of the planes form a super page 520. The super page 510/520 comprises many physical pages, and the flash memory controller 110 treats the super page 510/520 as a normal page when accessing the super page 510/520. For example, super page 510/520 itself is a writing unit. In addition, the super page is a logical page set by the flash memory controller 110 to facilitate management of the storage space, and is not a physical page.

In one embodiment, the super page 510/520 may further have a parity page if the decoder 134 supports the RAID mechanism. For example, the super page 510 may have five pages, wherein the five pages comprise CB11-CB14 and a parity page.

Figure 6:
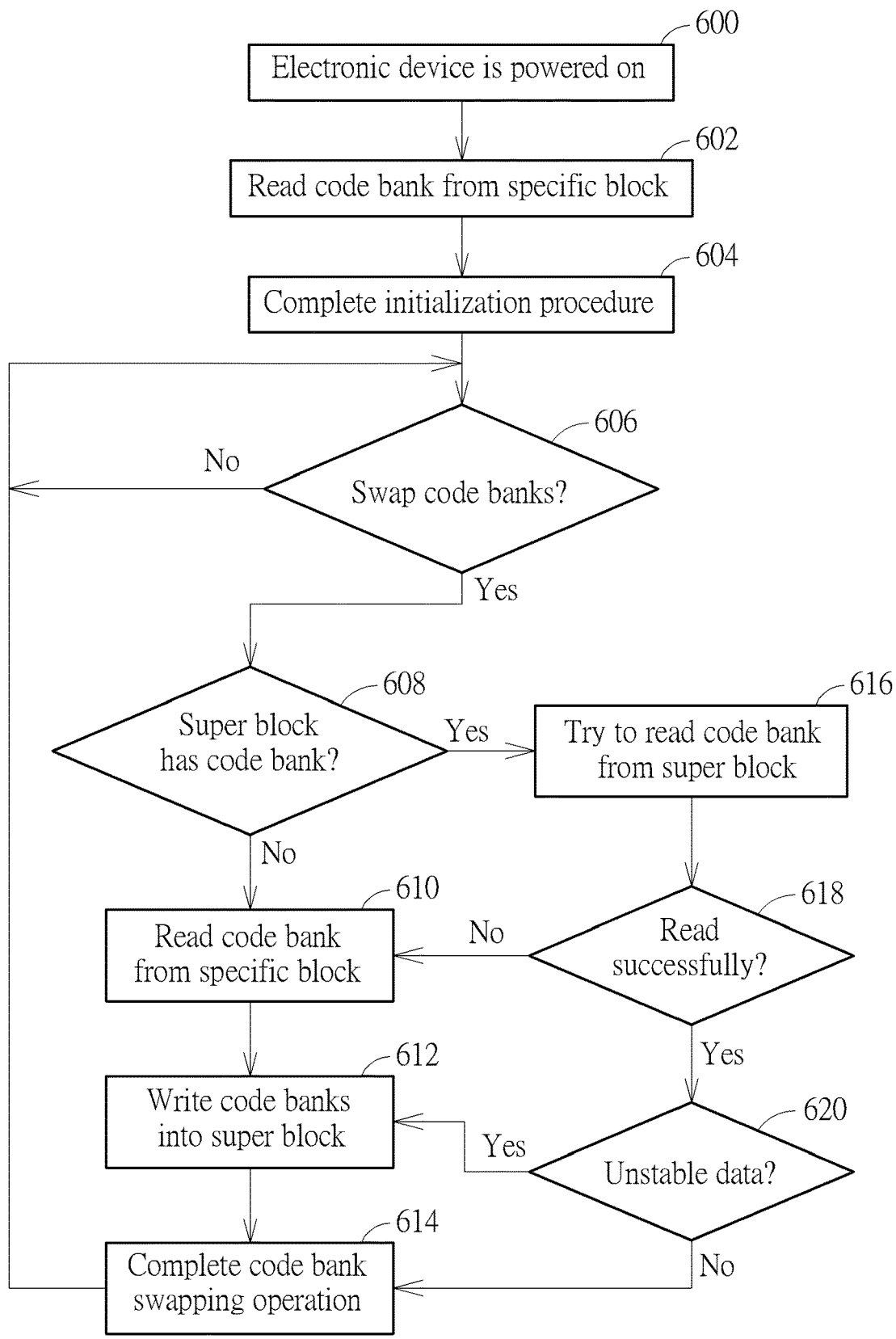
FIG. 6 is a flowchart of a control method of the flash memory controller and the flash memory module according to one embodiment of the present invention.

FIG. 6 is a flowchart of a control method of the flash memory controller 110 and the flash memory module 120 according to one embodiment of the present invention. In Step 600, the flow starts, and the electronic device 100 is powered on, and the microprocessor 112 loads the code 112C from the ROM 112M. In Step 602, the microprocessor 112 executes the code 112C to read one of the code banks from the block B0, and stores the code bank into the buffer memory 116. For example, the microprocessor 112 may read the pages P0-P3 of the block B0 to obtain the first code bank CB11-CB14, and stores the first code bank CB11-CB14 into the buffer memory 116. At this time, the other code banks such as the second code bank CB21-CB24 are not loaded due to the limited size of the buffer memory 116. In Step 604, the initialization procedure has been completed, and the microprocessor 112 can execute the first code bank CB11-CB14 (firmware) to manage the flash memory module 120.

In Step 606, the microprocessor 112 determines if swapping the code bank, if yes, the flow enters Step 608; and if not, the flow stays in Step 606. Specifically, because the functions of the first code bank and the second code bank are not the same, if the microprocessor 112 needs to perform the operation corresponding to the second code bank, the microprocessor 112 needs to load the second code bank from the flash memory module 120 to replace the first code bank temporarily stored in the buffer memory 116.

In Step 608, the microprocessor 112 refers to a meta pointer to determine if the super block 350 (i.e., the meta block) has the second code bank that is to be swapped, if yes, the flow enters Step 616; and if not, the flow enters Step 610.

In Step 610, the microprocessor 112 reads the pages P4-P7 of the block B0 to obtain the second code bank CB21-CB24, and stores the second code bank CB21-CB24 into the buffer memory 116. At this time, the first code bank CB11-CB14 is removed from the buffer memory 116.

In Step 612, the microprocessor 112 reads the code banks from the block B0, and writes the code banks into the super block 350. In Step 614, the code bank swapping operation completed, and the flow goes back to Step 606 to determine if swapping the code banks.

In Step 616, the microprocessor 616 tries to read the second code bank CB 21-CB24 from the super page 520 of the super block 350. In Step 618, the microprocessor 112 determines if the second code bank CB21-CB24 is successfully read from the super block 350, if yes, the flow enters Step 620; and if not, the flow enters Step 610.

In Step 620, the microprocessor 112 determines if the data stored in the super page 520 is unstable, if yes, the flow enters Step 612; and if not, the flow enters Step 614. Specifically, the microprocessor 112 can determine if the data stored in the super page 520 is unstable based on a decoding step or a bit error count. For example, if the decoder 134 cannot use a hard decode to decode the data read from the super page 520 to obtain the second code bank CB21-CB24, the microprocessor 112 can determine that the data stored in the super page 520 is unstable. In another example, if the bit error count of the data read from the super page 520 is greater than a threshold, the microprocessor 112 can determine that the data stored in the super page 520 is unstable.

In the embodiment shown in FIG. 6, because the block B0 is only read during initialization procedure and when the code banks cannot be read from the super block 350, the read count of the block B0 can be greatly reduced, and the read disturbance of the block B0 can be improved. In addition, because the flash memory controller 110 can manage the super block 350 by using garbage collection mechanism, read reclaim mechanism, read retry mechanism, RAID decoding mechanism, it is rare for the block B0 to be unreadable. Furthermore, because the first/second code bank is sequentially stored in the block B0 while the first/second code bank is stored in the super page 510 in parallel, the speed of reading the first/second code bank from the super page 510/520 is about four times faster than the speed of reading the first/second code bank from the block B0, that is the embodiment can increase the speed of swapping the code banks.

Figure 7:
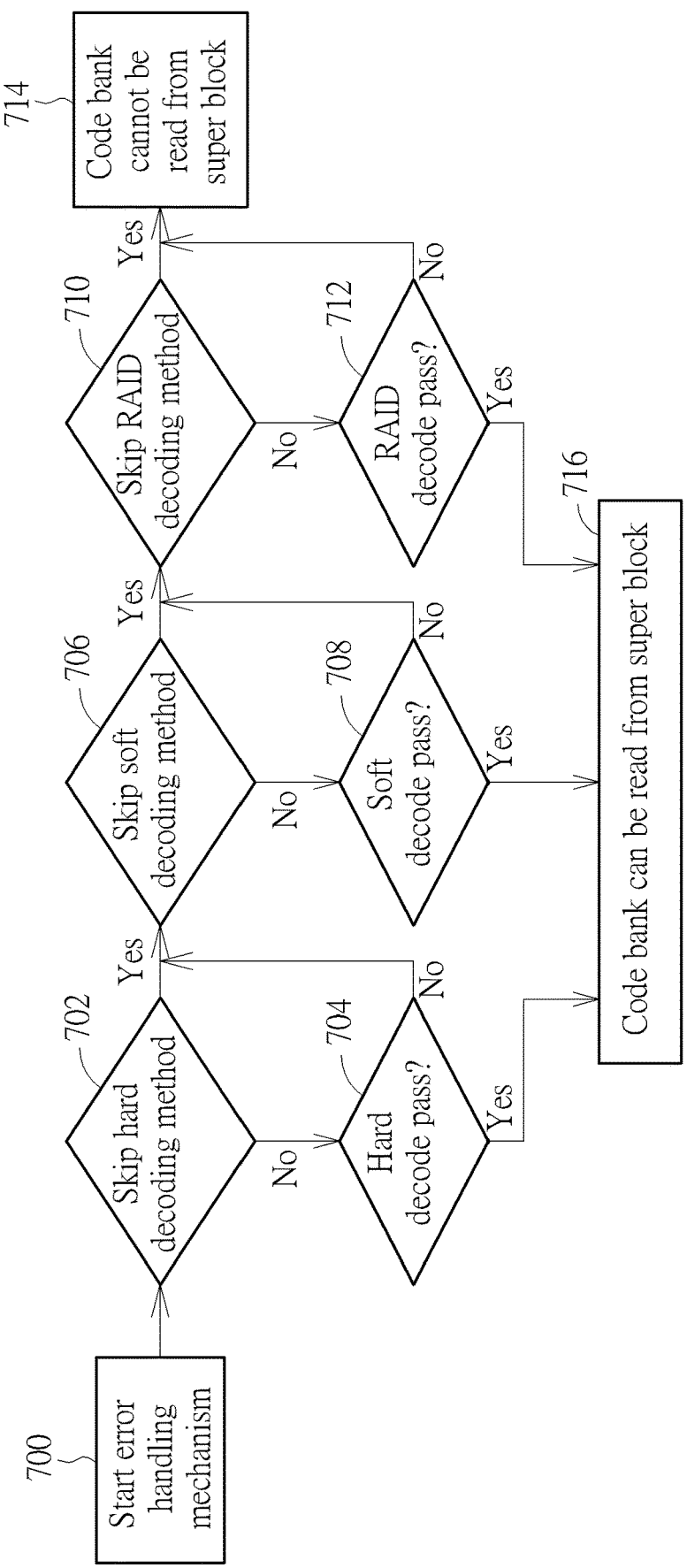
FIG. 7 shows the error handling mechanism according to one embodiment of the present invention.

In one embodiment, regarding Step 618, if the decoder 134 fails to use a default read mechanism to read the second code bank CB21-CB24 from the super block 350, the microprocessor 112 and the decoder 134 enter an error handling mechanism to determine if the second code bank CB21-CB24 can be successfully read from the super block 350, and the decoder 134 refers to a setting to determine if using the hard decoding method, the soft decoding method, and/or the RAID decoding method to retry the decoding steps. In this embodiment, the hard decoding method may be a Bose-Chaudhuri-Hocquenghem (BCH) decoding method or a low-density parity-check (LDPC) decoding method, the soft decoding method may be LDPC decoding method for decoding readout information obtained by using predetermined read voltages and adjusted read voltages. Specifically, refer to FIG. 7, which shows the error handling mechanism according to one embodiment of the present invention. In Step 700, the flow starts and enters the error handling mechanism. In Step 702, the microprocessor 112 determines if the setting indicates skipping the hard decoding method, if yes, the flow enters Step 706; and if not, the flow enters Step 704. In Step 704, the decoder 134 uses the hard decoding method to decode the data read from the super block 350, and the decoder 134 determines if the data can be successfully decoded, if yes, the flow enters Step 716; and if not, the flow enters Step 706.

In Step 706, the microprocessor 112 determines if the setting indicates skipping the soft decoding method, if yes, the flow enters Step 710; and if not, the flow enters Step 708. In Step 708, the decoder 134 uses the soft decoding method to decode the data read from the super block 350, and the decoder 134 determines if the data can be successfully decoded, if yes, the flow enters Step 716; and if not, the flow enters Step 710.

In Step 710, the microprocessor 112 determines if the setting indicates skipping the RAID decoding method, if yes, the flow enters Step 714; and if not, the flow enters Step 712. In Step 712, the decoder 134 uses the RAID decoding method to decode the data read from the super block 350, and the decoder 134 determines if the data can be successfully decoded, if yes, the flow enters Step 716; and if not, the flow enters Step 714.

In Step 714, the microprocessor 112 determines that the code bank cannot be successfully read from the super block 350, and a code bank fail flag is set for the microprocessor 112 to read the code banks from the block B0, and to write the code banks into the super block 350.

In Step 716, the microprocessor 112 determines that the code bank can be successfully read from the super block 350, and a code bank risky flag is set for the microprocessor 112 to determine if the code bank stored in the super block 350 is unstable.

In one embodiment, because the soft decoding method needs to use additional voltages to read the memory cells, and the RAID decoding method needs to read parity page in other planes, the setting may skip these two decoding methods to increase the speed of swapping the code banks. In one embodiment, the hard decoding method may also be skipped to further improve the speed.

Briefly summarized, in the embodiments of the present invention, by arranging the code banks in the specific block and the super block, and using the code banks stored in the super block for the code bank swapping operation, the read count of the specific block can be greatly reduced, and the read disturbance of the specific block can be improved. In addition, because the code banks are sequentially stored in the specific block while the code banks are stored in the super blocks in parallel, the speed of reading the code banks from the super block is faster than the speed of reading the code banks from the specific block, that is the speed of swapping the code banks is increased.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A control method of a flash memory controller, wherein the flash memory controller is configured to access a flash memory module, the flash memory module comprises a plurality of planes, each plane comprises a plurality of blocks, and each block comprises a plurality of pages; and the control method comprises the steps of:
    after the flash memory controller is powered on, reading a first code bank from a specific block of the plurality of blocks;
    storing the first code bank into a buffer memory;
    executing the first code bank to manage the flash memory module;
    when the flash memory controller starts a code bank swapping operation, trying to read a second code bank from a super block, wherein the super block comprises a plurality of blocks respectively located in at least two planes;
    if the second code bank is read successfully, storing the second code bank into the buffer memory to replace the first code bank, and executing the second code bank to manage the flash memory module; and
    if the second code bank is not read from the super block successfully, reading the second code bank from the specific block, storing the second code bank into the buffer memory to replace the first code bank, and executing the second code bank to manage the flash memory module.

2. The control method of claim 1, wherein the step of reading the first code bank from the specific block of the plurality of blocks comprises:
    using a one-plane-read operation to read the first code bank from the specific block; and
    the step of reading the second code bank from the super block comprises:
    using a multi-plane-read operation to read the second code bank from the super block.

3. The control method of claim 1, further comprising:
    after reading the second code bank from the specific block, writing the second code bank read from the specific block into the super block.

4. The control method of claim 1, further comprising:
    if the second code bank is read from the super block successfully, determining if data stored in the super block is unstable;
    if the data stored in the super block is unstable, reading the first code bank and second code bank from the specific block, and writing the first code bank and second code bank read from the specific block into the super block.

5. The control method of claim 1, wherein the step of trying to read the second code bank from the super block comprises:
  using a default read mechanism to read the second code bank from the super block;
  if it is failed to use the default read mechanism to read the second code bank, referring to a setting to further use a hard decoding method, a second decoding method, and/or a redundant array of independent disks (RAID) decoding method to decode the second code bank read from the super block.

6. A flash memory controller, wherein the flash memory controller is configured to access a flash memory module, the flash memory module comprises a plurality of planes, each plane comprises a plurality of blocks, and each block comprises a plurality of pages; and the flash memory controller comprises:
  a read only memory (ROM), arranged to store a program code;
  a microprocessor, configured to execute the program code to control the access of the flash memory module;
  wherein the microprocessor is configured to perform the steps of:
  after the flash memory controller is powered on, reading a first code bank from a specific block of the plurality of blocks;
  storing the first code bank into a buffer memory;
  executing the first code bank to manage the flash memory module;
  when the flash memory controller starts a code bank swapping operation, trying to read a second code bank from a super block, wherein the super block comprises a plurality of blocks respectively located in at least two planes;
  if the second code bank is read successfully, storing the second code bank into the buffer memory to replace the first code bank, and executing the second code bank to manage the flash memory module; and
  if the second code bank is not read from the super block successfully, reading the second code bank from the specific block, storing the second code bank into the buffer memory to replace the first code bank, and executing the second code bank to manage the flash memory module.

7. The flash memory controller of claim 6, wherein the step of reading the first code bank from the specific block of the plurality of blocks comprises:
  using a one-plane-read operation to read the first code bank from the specific block; and
  the step of reading the second code bank from the super block comprises:
    using a multi-plane-read operation to read the second code bank from the super block.

8. The flash memory controller of claim 6, further comprising:
  after reading the second code bank from the specific block, writing the second code bank read from the specific block into the super block.

9. The flash memory controller of claim 6, further comprising:
  if the second code bank is read from the super block successfully, determining if data stored in the super block is unstable;
  if the data stored in the super block is unstable, reading the first code bank and second code bank from the specific block, and writing the first code bank and second code bank read from the specific block into the super block.

10. The flash memory controller of claim 6, wherein the step of trying to read the second code bank from the super block comprises:
  using a default read mechanism to read the second code bank from the super block;
  if it is failed to use the default read mechanism to read the second code bank, referring to a setting to further use a hard decoding method, a second decoding method, and/or a redundant array of independent disks (RAID) decoding method to decode the second code bank read from the super block.

11. An electronic device, comprises:
  a flash memory module, the flash memory module comprises a plurality of planes, each plane comprises a plurality of blocks, and each block comprises a plurality of pages; and
  a flash memory controller, configured to perform the steps of:
  after the flash memory controller is powered on, reading a first code bank from a specific block of the plurality of blocks;
  storing the first code bank into a buffer memory;
  executing the first code bank to manage the flash memory module;
  when the flash memory controller starts a code bank swapping operation, trying to read a second code bank from a super block, wherein the super block comprises a plurality of blocks respectively located in at least two planes;
  if the second code bank is read successfully, storing the second code bank into the buffer memory to replace the first code bank, and executing the second code bank to manage the flash memory module; and
  if the second code bank is not read from the super block successfully, reading the second code bank from the specific block, storing the second code bank into the buffer memory to replace the first code bank, and executing the second code bank to manage the flash memory module.

12. The electronic device of claim 11, wherein the step of reading the first code bank from the specific block of the plurality of blocks comprises:
  using a one-plane-read operation to read the first code bank from the specific block; and
  the step of reading the second code bank from the super block comprises:
    using a multi-plane-read operation to read the second code bank from the super block.

13. The electronic device of claim 11, further comprising:
  after reading the second code bank from the specific block, writing the second code bank read from the specific block into the super block.

14. The electronic device of claim 11, further comprising:
  if the second code bank is read from the super block successfully, determining if data stored in the super block is unstable;
  if the data stored in the super block is unstable, reading the first code bank and second code bank from the specific block, and writing the first code bank and second code bank read from the specific block into the super block.

15. The electronic device of claim 11, wherein the step of trying to read the second code bank from the super block comprises:
  using a default read mechanism to read the second code bank from the super block;
  if it is failed to use the default read mechanism to read the second code bank, referring to a setting to further use a hard decoding method, a second decoding method, and/or a redundant array of independent disks (RAID) decoding method to decode the second code bank read from the super block.

* * * * *